March 30, 1954  H. L. THOMPSON  2,673,746
FIFTH WHEEL FOR VEHICLES
Filed Nov. 28, 1952
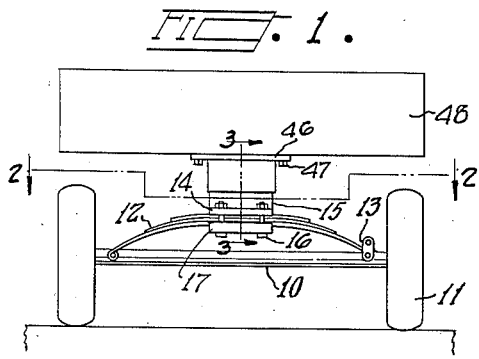
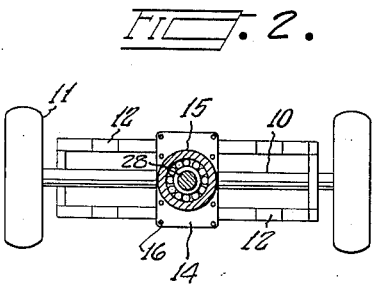
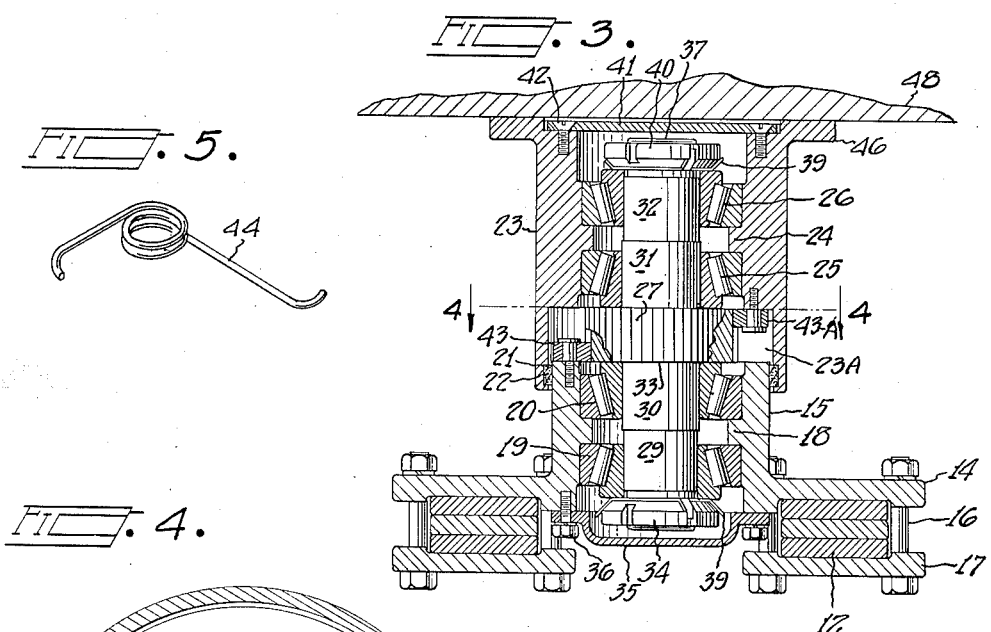
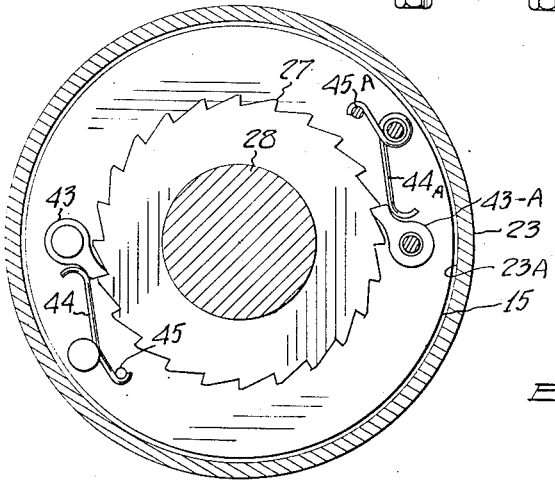
INVENTOR
HERRIED L. THOMPSON
BY
*E. B. Birkenbuel.*
ATTORNEY Patented Mar. 30, 1954

2,673,746

UNITED STATES PATENT OFFICE 2,673,746

FIFTH WHEEL FOR VEHICLES

Herried L. Thompson, Portland, Oreg.

Application November 28, 1952, Serial No. 322,950

3 Claims. (Cl. 280—125)

This invention relates generally to motor driven vehicles and particularly to a fifth wheel for vehicles.

The main object of this invention is to provide a pivotal connection between driving and trailing units, which will be protected from "spotting" or having flat spots formed on the pivot pin due to the constant pounding such devices receive on the roadway.

The second object is to so construct the device that it will be inexpensive to manufacture, light in weight, and capable of complete sealing.

The third object is to provide a pivot or fifth wheel for bolsters or two axle trailers.

I accomplish these and other objects in the manner set forth in the following specification as illustrated in the accompanying drawing, in which Fig. 1 is a rear elevation of a vehicle equipped with my device.

Fig. 2 is a sectional plan taken along the line 2—2 in Fig. 1.

Fig. 3 is a vertical section taken along the line 3—3 in Fig. 1.

Fig. 4 is a horizontal section taken along the line 4—4 in Fig. 3.

Fig. 5 is a perspective view of the ratchet spring.

Like numbers of reference refer to the same or similar parts throughout the several views.

Referring in detail to the drawing, there is shown an axle 10 supported by the wheels 11. Springs 12 are attached to the axle 10 at their outer ends by means of a clevis 13. The springs 12 are united by the flanges 14 of the lower housing 15. Bolts 16 extend through the flanges 14 and plates 17 to hold the housing 15 in place on the springs 12.

In the housing 15 is formed a shoulder 18, below which is placed a thrust bearing 19, and above which shoulder is placed a thrust bearing 20.

A seal groove 21 for a seal 22 is formed in the upper housing 23 whose counterboard lower end 23-A receives the upper end of the housing 15.

In the upper housing 23 is formed a shoulder 24, below which is placed a thrust bearing 25 and above which is placed a thrust bearing 26.

The ratchet wheel 27 forms a spacer between the bearings 20 and 25 and is part of the vertical shaft 28, having the steps 29, 30, 31 and 32 occupying the bearings 19 and 20, 25 and 26. The face 33 of the wheel 27 rests on top of the bearing 20.

The lower end of the shaft 28 is threaded to receive a nut 34, preferably of the castellated variety. A cap 35 is secured across the lower end of the housing 15 by means of bolts 36.

On the reduced upper end 37 of the shaft 28 is placed a nut 40, which is secured to the shaft 28 by means of a key 39. The nut 40 engages the bearing 26. The nut 34 is also held against movement by means of a key 39.

A cover plate 41 is placed over the top of the upper housing 23 and is held by the screws 42. On the top of the housing 15 is the pawl 43, which is urged toward the ratchet wheel 27 by the spring 44, which is anchored to the pin 45 in the housing 15.

In the counterbored lower end 23-A of the housing 23 is a pawl 43-A, which is urged toward the ratchet wheel 27 by the spring 44-A, which is anchored to the pin 45-A in the housing 23.

The housing 23 is provided with a flange 46, which is held by bolts 47 to the bolster 48, or other supported vehicle member.

In the operation of the device, any turning movement of the vehicle causes a partial rotation of the shaft 28 in one direction only so that there will be no accumulated wear centered at some particular point in the bearings 19 and 20, 25 and 26, which might otherwise become serious.

It will be understood that the housings 15 and 23 are packed with lubricant and, since the actual wear is slight and the lubricant is kept clean, it will last indefinitely and the troublesome kingpin has been eliminated.

I claim:

1. A fifth wheel for vehicles comprising in combination upper and lower cylindrical housings, the adjacent ends of which are telescoped, each of said housings having an internal shoulder between the upper and lower ends thereof, opposed thrust bearings mounted in each of said housings above and below said shoulders, a shaft mounted in said bearings, a ratchet wheel on said shaft between the innermost bearings, a nut on the lower end of said shaft engaging the lowermost bearing, a second nut on the upper end of said shaft engaging the uppermost bearing, and spring urged pawls mounted in said lower housing engaging said ratchet wheel, limiting its rotation to one direction.

2. The fifth wheel as described in claim 1, together with clamping flanges on the lower housing for attaching it to supporting springs and a bolster attached to the upper housing for supporting a load thereon.

3. A fifth wheel for dual axle trailers comprising in combination a pair of cylindrical housings disposed on a vertical axis, adjacent ends of which telescope, the lower housing having flanges thereon for attaching the housing to the vehicle springs, the upper housing having flanges thereon for attaching it to a vehicle bolster, a pair of opposed thrust bearings in each housing, the two intermediate bearings having a spacing ratchet wheel therebetween, a stepped shaft occupying all of said bearings, the lower end of said shaft having a nut thereon engaging the lowermost bearing, the uppermost end of said shaft having a head engaging the uppermost bearing, a cover over said upper housing, spring urged pawls engaging said ratchet wheel supported by said lower housing, and means for supporting a bolster upon said upper housing.

HERRIED L. THOMPSON.

References Cited in the file of this patent

UNITED STATES PATENTS

| Number | Name | Date |
|---|---|---|
| 1,769,933 | Arutunoff | July 8, 1930 |

FOREIGN PATENTS

| Number | Country | Date |
|---|---|---|
| 529,498 | Germany | Dec. 28, 1929 |